United States Patent
Chang et al.

(10) Patent No.: US 7,397,643 B2
(45) Date of Patent: Jul. 8, 2008

(54) PROTECTION CIRCUIT

(75) Inventors: Yu-Ching Chang, Taoyuan Hsien (TW);
Ming-Chia Wu, Taoyuan Hsien (TW);
Chung-Jung Kuo, Taoyuan Hsien (TW)

(73) Assignee: Delta Electronics, Inc., Taoyuan Hsien (TW)

( * ) Notice: Subject to any disclaimer, the term of this patent is extended or adjusted under 35 U.S.C. 154(b) by 381 days.

(21) Appl. No.: 11/334,412

(22) Filed: Jan. 19, 2006

(65) Prior Publication Data

US 2006/0164768 A1 Jul. 27, 2006

(30) Foreign Application Priority Data

Jan. 27, 2005 (TW) .............................. 94102457 A

(51) Int. Cl.
*H02H 3/20* (2006.01)
(52) U.S. Cl. ..................... 361/91.2; 361/35; 361/111
(58) Field of Classification Search ............ 361/35, 361/91.2, 91.4, 111; 315/309
See application file for complete search history.

(56) References Cited

U.S. PATENT DOCUMENTS

| | | | | |
|---|---|---|---|---|
| 6,107,755 A | * | 8/2000 | Katyl et al. | 315/307 |
| 6,130,813 A | * | 10/2000 | Kates et al. | 361/93.1 |
| 2002/0175637 A1 | * | 11/2002 | Wilhelm | 315/224 |
| 2004/0032754 A1 | * | 2/2004 | Yang | 363/56.09 |

\* cited by examiner

*Primary Examiner*—Michael J Sherry
*Assistant Examiner*—Tien Mai
(74) *Attorney, Agent, or Firm*—Birch, Stewart, Kolasch & Birch, LLP

(57) ABSTRACT

A protection circuit is coupled between a secondary winding of a transformer and a load. When voltage at the secondary winding of the transformer becomes abnormal, the protection circuit disconnects the power connection to the load so as to protect the load from damage. When the voltage at the secondary winding of the transformer returns normal, the protection circuit restores power to the load.

10 Claims, 4 Drawing Sheets

PROTECTION CIRCUIT

BACKGROUND

The disclosure relates in general to a protection circuit, and in particular to a protection circuit for voltage overload.

Voltage sources deliver current to electronic device, normally through a transformer. For safety, an protection circuit between the voltage source and the electronic device safeguards abnormal power supply, preventing damage.

FIG. 1 is a block diagram of a electronic system with an protection circuit. The system comprises a voltage source 10, an protection circuit 12, a transformer 15, and a load 16. Protection circuit 12 incorporates a breaking circuit 121 and a detection feedback circuit 122. Transformer 15 comprises a primary winding 151 coupled to voltage source 10 via a breaking circuit 121, and a secondary winding 152 coupled to load 16 and a detection feedback circuit 122. Load 16 may be any type of electronic device, such as a light tube. Load 16 is coupled to ground. Detection feedback circuit 122 is further coupled to breaking circuit 121, and detects abnormal voltage at secondary winding 152. If the voltage at secondary winding 152 renders an abnormal value, i.e. output voltage exceeds a predetermined value, the detection circuit 122 generates a signal, such that breaking circuit 121 interrupts the circuit.

Protection circuit 12 does not restore breaking circuit 121, nor does it resume operation of load 16, despite the voltage returning to normal. This imposes a design limitation to the applications. As a compensation a restore circuit is incorporated into the circuitry, results in more complex circuitry, increased component count, and manufacturing cost increases.

Thus an protection circuit is in need, providing over voltage protection upon abnormal voltage detection, and power supply restoration under normal condition.

SUMMARY

A protection circuit according to the present invention comprises a first impedance coupled to a secondary winding and a load, a second impedance coupled to the secondary winding, a third impedance coupled to the first impedance, a temperature-controlled variable resistor coupled to the second impedance; and a switch comprising a first note, a second node, a third node and a fourth node, the first node coupled to the temperature-controlled variable resistor, the second node coupled to the third impedance, the third node coupled to the load, and the fourth node coupled to ground.

Resistance of the temperature-controlled variable resistor increases along with temperature.

When voltage at the first node is not less than voltage at the second node, the third node and the fourth node of the switch short; when the voltage at the first node is less than at the second node, the third node and fourth node of the switch open.

The second impedance and the third impedance are resistors or capacitors.

The circuit further comprises a fourth resistor, coupled to the second impedance, and to the ground, wherein the fourth resistor is a resistor or a capacitor.

The circuit further comprises a fifth resistor, coupled to the third impedance, and the ground.

The first impedance is a resistor or a capacitor.

A primary winding of the transformer is coupled to a voltage source.

The switch is a photodiode or a optoelectronic switch.

BRIEF DESCRIPTION OF THE DRAWINGS

The invention will become more fully understood from the detailed description, given hereinbelow, and the accompanying drawings. The drawings and description are provided for purposes of illustration only and, thus, are not intended to be limiting of the present invention.

DETAILED DESCRIPTION

Figure 1:
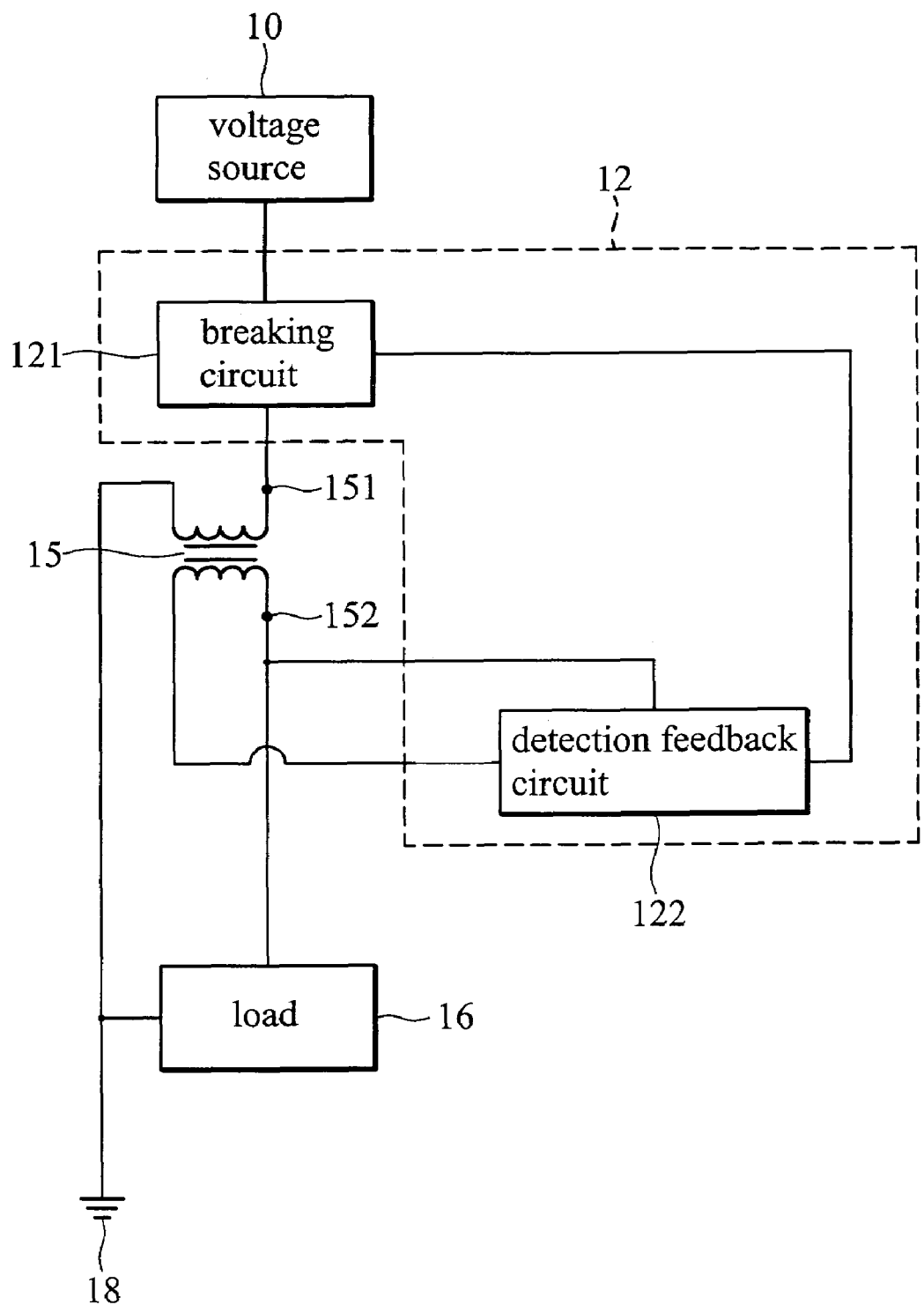
FIG. 1 is a block diagram of a conventional protection circuit.
Figure 2:
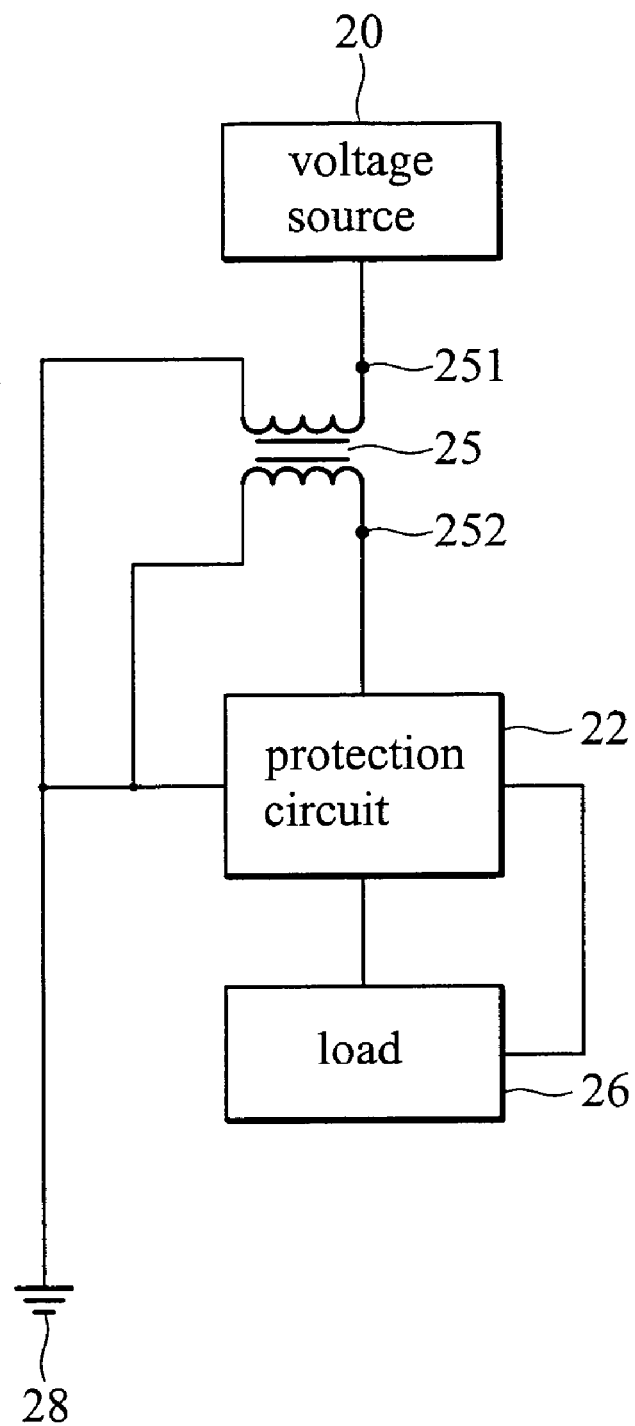
FIG. 2 is a block diagram of an protection circuit, according to an embodiment of the present invention.

FIG. 2 is a functional block diagram of an electronic system with a protection circuit, as an embodiment in the present invention. The system comprises a voltage source 20, a transformer 25, an protection circuit 22, and a load 26. Voltage source 20 supplies voltage. The transformer 25 comprises a primary winding 251 coupled to voltage source 20, and a secondary winding 252 coupled to protection circuit 22. Protection circuit 22 is further coupled to ground 28 and load 26, which can be any electronic device, such as a light tube.

Protection circuit 22 monitors voltage at secondary winding 252. When the voltage rises beyond a predetermined value, protection circuit 22 intercepts the connection to load 26, protecting load 26 against over voltage damages. When the voltage falls below the predetermined value, protection circuit 22 restores the connection, and load 26 resumes operation. Thus protection circuit 22 delivers automatic power restoration for load 26.

Figure 3:
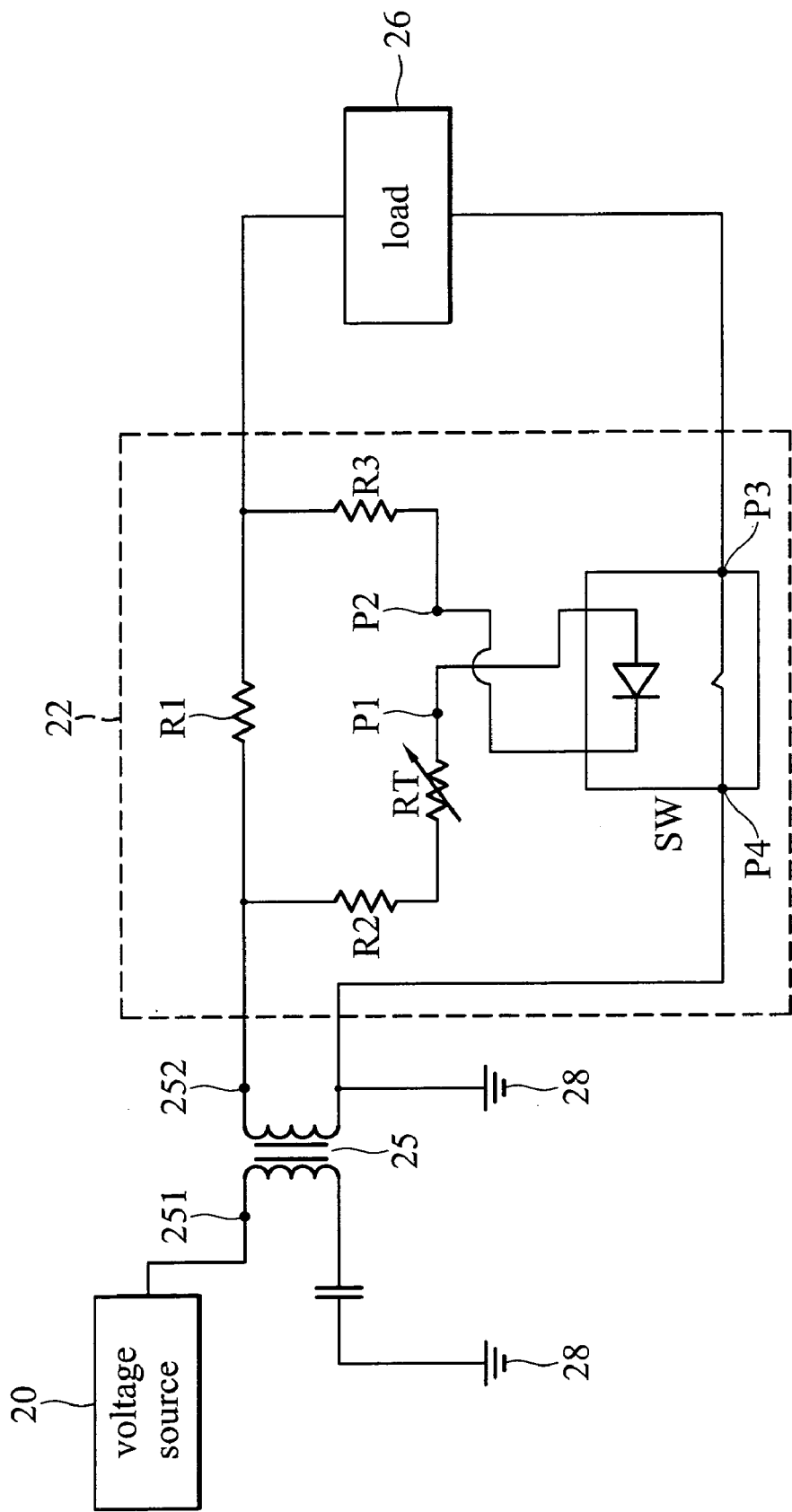
FIG. 3 is a circuit diagram of a protection circuit, according to an embodiment of the present invention.

FIG. 3 is a circuit schematic diagram for the electronic device system with an protection circuit in FIG. 2, according to an embodiment of the present invention. As shown in FIG. 3, protection circuit 22 is coupled between secondary winding 252 of transformer 25 and a load 26, comprising a first impedance R1, a second impedance R2, a third impedance R3, a temperature-controlled variable resistor RT, and a switch SW. The second resister R2 has a first end coupled to secondary winding 252. The first impedance R1 has a first end coupled to secondary winding 252 and a second end coupled to a first end of the load 26. The third impedance R3 has a first end coupled to the second end of the first impedance R1. Temperature-controlled variable resistor RT has a first end coupled to a second end of the second impedance R1. Switch SW comprises a first node P1, a second node P2, a third node P3, and a fourth node P4. The first node P1 is coupled to a second end of the temperature-controlled variable resistor RT. The second node P2 is coupled to a second end of the third impedance R3. The third node P3 is coupled to a second end of load 26. Finally the fourth node P4 is coupled to ground 28. Switch SW may be a photodiode switch or an optoelectronic switch.

When the voltage at voltage source 20 is less than a predetermined value, protection circuit 22 operates normally. The second impedance R2 and temperature-controlled variable resistor RT are connected in series, in turn connected in parallel to the third impedance R3, such that the voltage at the first node P1 always exceeds that of the second node P2 in switch SW. Consequently, the third node P3 and the fourth node P4 of switch SW remains short circuited, since switch SW is a photodiode switch or an optoelectronic switch. The current from secondary winding 252 reaches load 26, and circulates around the third node P3 and the fourth node P4 of switch SW, operating load 26.

When the voltage at voltage source 20 overtakes the predetermined value, the excessive voltage builds up heat energy in the circuitry, resulting in an increase in the resistance of temperature-controlled variable resistor RT. Thus the voltage across the second impedance R2 and temperature-controlled variable resistor RT increases. As a consequence, the voltage at the first node P1 is less than that at the second node P2 in switch SW. At this point, the third node P3 and the fourth node P4 of switch SW are disconnected, isolating load 26 from voltage damage. Protection circuit 22 thus shields the electronic device against excessive voltage.

The employment of second impedance R2 and third impedance R3 present another embodiment of the present invention. Those in the art may make appropriate modifications to the embodiment, so long as the second impedance R2 and the third impedance R3 can extract voltage across the two ends of the first impedance R1 for circuit operation. Hence second impedance R2 and third impedance R3 can be replaced with a first capacitor (not shown) and a second capacitor (not shown), and the modified circuit may accomplish equivalent functionality.

When switch SW is open, and voltage once again falls below the predetermined voltage, the voltage at the first node P1 exceeds that at the second node P2. Consequently the connection between the third node P3 and the fourth node P4 of switch SW is renewed, rendering normal operation of load 26. Protection circuit 22 thus provides of automatic restoration.

Figure 4:
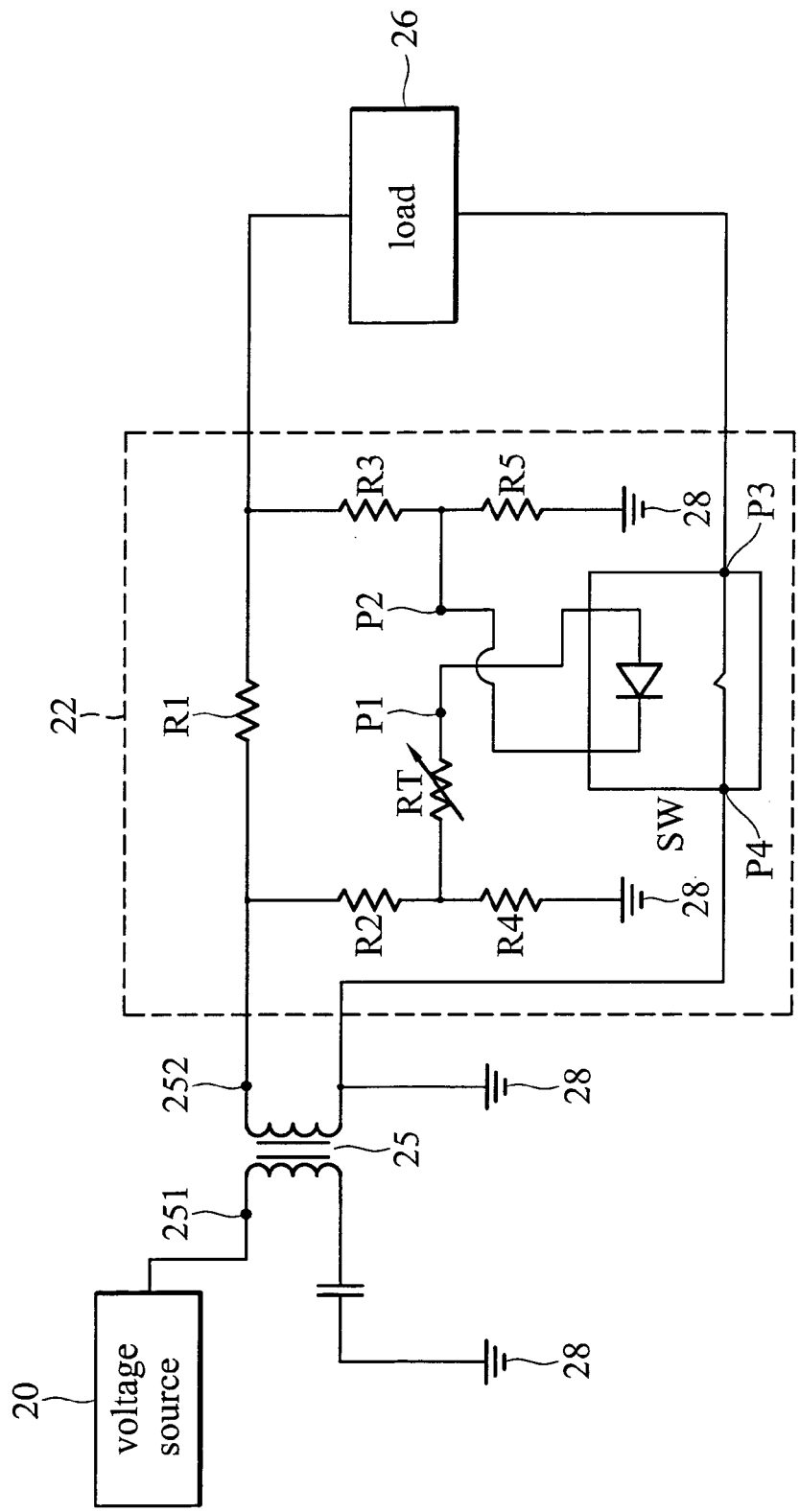
FIG. 4 is a circuit diagram of an protection circuit, according to another embodiment of the present invention.

FIG. 4 is a detailed circuit diagram of the electronic device system with an protection circuit in FIG. 2, in another embodiment of the present invention. The circuit interconnection, other than protection circuit 22, is identical to those in the embodiment of FIG. 3. Protection circuit 22 coupled between secondary winding 252 and load 26 comprises, a first impedance R1, a second impedance R2, a third impedance R3, a fourth resistor R4, a fifth resistor R5, a temperature-controlled variable resistor RT, and a switch SW. The first impedance R1 has a first end coupled to secondary winding 252 and a second end coupled to a first end of the load 26. The second impedance R2 has a first end coupled to secondary winding 252. The fourth resistor R4 has a first end coupled to the second impedance R2 and a second end coupled to the ground 28. The third impedance R3 has a first end coupled to the first impedance R1. The fifth resistor R5 has a first end coupled to a second end of the third impedance R3 and a second end coupled to ground 28. Temperature-controlled variable resistor RT has a first end coupled to the second impedance R2. Switch SW comprises a first node P1, a second node P2, a third node P3, and a fourth node P4. The first node P1 is coupled to a second end of the temperature-controlled variable resistor RT. The second node P2 is coupled to a second end of the third impedance R3. The third node P3 is coupled to a second end of load 26, and the fourth node P4 is coupled to the ground 28. Once again, switch SW thereof may be a photodiode switch or an optoelectronic switch.

Based on a principle similar to the embodiment of FIG. 3, the embodiment takes the second impedance R2 and the fourth resistor R4 in series, in conjunction with series connecting the third impedance R3 and the fifth resistor R5 in parallel, rendering application in various fields such as high voltage circuits, and alternative current circuits, and others. As the voltage at voltage source 20 falls below a predetermined value, the voltage at the first node P1 of switch SW is not less than that at the second node P2, thus the connection between the third node P3 and the fourth node P4 is short. The current from secondary winding 252 passes through load 26, and circulates along the third node P3 and the fourth node P4 to the ground, resulting in normal operation of load 26. When the voltage at voltage source 20 exceeds the predetermined value, the resistance of temperature-controlled variable resistor RT increases, leading to a voltage decrease at node 1. Consequently the voltage at the first node P1 is less than the voltage at the second node P2, the third node P3 and the fourth node P4 disconnect, and the current thereof cannot be conducted through load 26, protecting load 26 from damage.

The second impedance R2, the third impedance R3, the fourth resistor R4, and the fifth resistor R5 are provided here merely as an illustration. With an appropriate selection of the second impedance R2, the third impedance R3, the fourth resistor R4, and the fifth resistor R5, a circuit may be configured corresponding to the circuit operation of embodiment in FIG. 4, through the principle of voltage dividing. Hence the second impedance R2, the third impedance R3, the fourth resistor R4, and the fifth resistor R5 may be replaced with a second capacitor (not shown), a third capacitor (not shown), a fourth capacitor (not shown), and a fifth capacitor (not shown), yet achieving equivalent functionality.

Moreover, it is valid to construct a design with the first node P1 coupled to secondary winding 252 via temperature-controlled variable resistor RT, and the corresponding secondary winding P2 coupled to load 26, as long as the voltage at first node P1 is not less than that at the second node P2 when voltage is less than the predetermined value; and the voltage at first node P1 is less than that at the second node P2 when voltage exceeds the predetermined value.

The circuit configuration of the embodiment in FIG. 4 also provides automatic restoration functionality, as the circuit configuration in FIG. 3.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A protection circuit, coupled between a secondary winding of a transformer and a load, comprising:
   a first impedance having a first end coupled to a first end of the secondary winding and a second end coupled to a first end of the load, and a second end of the secondary winding coupled to ground;
   a second impedance having a first end coupled to the first end of the secondary winding;
   a third impedance having a first end coupled to the second end of the first impedance;
   a temperature-controlled variable resistor having a first end coupled to a second end of the second impedance; and
   a switch comprising a first node, a second node, a third node and a fourth node, wherein the first node is coupled to a second end of the temperature-controlled variable resistor, the second node is coupled to a second end of the third impedance, the third node is coupled to a second end of the load, and the fourth node is coupled to the ground.

2. The protection circuit of claim 1, wherein resistance of the temperature-controlled variable resistor increases along with temperature.

3. The protection circuit of claim 2, wherein the third node and the fourth node of the switch are shorted when voltage at the first node is not less than that at the second node; and the third node and fourth node of the switch are open when the voltage at the first node is less than that at the second node.

4. The protection circuit of claim 1, wherein the first impedance, the second impedance and the third impedance are resistors or capacitors, respectively.

5. The protection circuit of claim 1, further comprising a fourth resistor having a first end coupled to the second end of the second impedance and a second end coupled to the ground.

6. The protection circuit of claim 5, further comprising a fifth resistor, having a first end coupled to the second end of the third impedance and a second end coupled to the ground.

7. The protection circuit of claim 6, wherein the fourth resistor and the fifth resistor are resistors or capacitors, respectively.

8. The protection circuit of claim 1, wherein a primary winding of the transformer is coupled to a voltage source.

9. The protection circuit of claim 1, wherein the switch is a photodiode switch or an optoelectronic switch.

10. The protection circuit of claim 1, wherein the load is a light tube.

* * * * *